March 3, 1964   F. E. WALKER   3,122,881
MARINE ENGINE
Filed Nov. 15, 1960
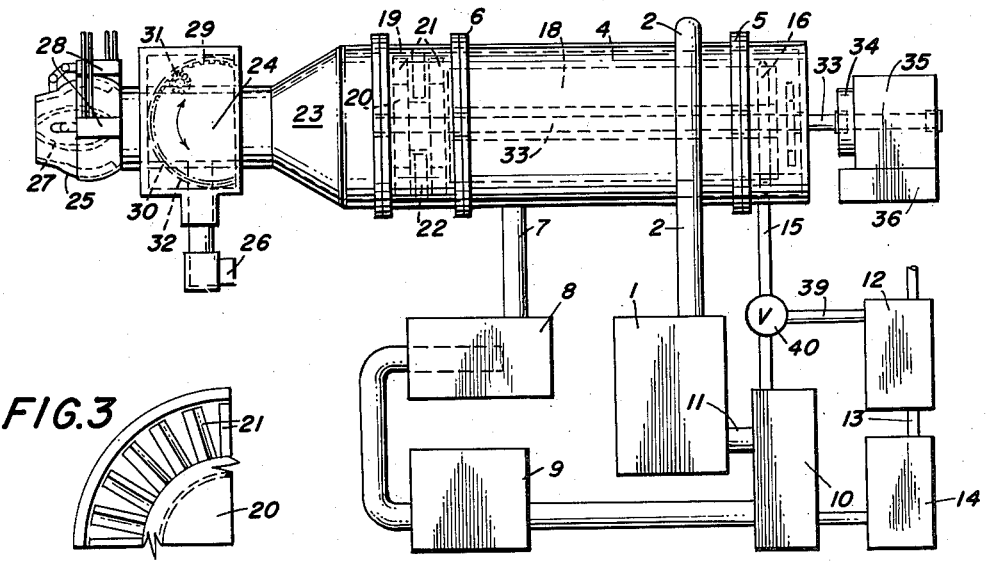
FIG. 1
FIG. 3
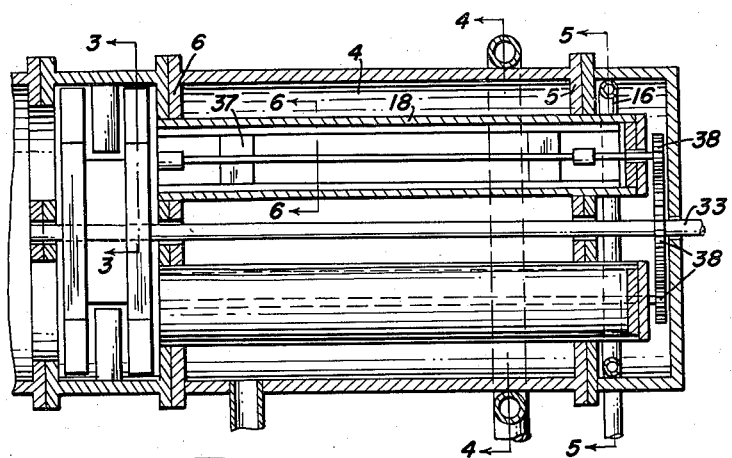
FIG. 2
FIG. 6
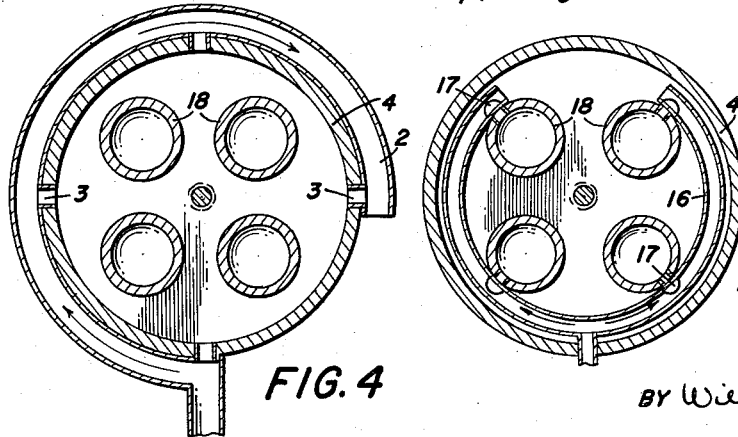
FIG. 5
FIG. 4
INVENTOR
FRANKLIN E. WALKER
BY William W. [signature]
ATTORNEY

3,122,881
MARINE ENGINE
Franklin E. Walker, Camp Springs, Md.
(5893 Greenridge Road, Castro Valley, Calif.)
Filed Nov. 15, 1960, Ser. No. 69,508
2 Claims. (Cl. 60—35.5)

The following patent application is a continuation-in-part of the patent application for Marine Engine Serial No. 50,233 assigned a filing date of August 17, 1960 and now abandoned.

This invention relates to a marine engine and, more particularly, to such an engine in which the propulsive force is a steam jet generated through heat exchange involving a nuclear reactor.

Objects of the invention are to provide an engine capable of driving surface vessels or submerged vessels at good speeds and with high maneuverability, while at the same time providing for power requirements generally of a vessel.

Other objects, advantages and features will appear from the following description of a preferred embodiment of the invention, taken together with the attached drawings of said embodiment, in which:

FIG. 1 is a diagrammatic drawing of the presently preferred embodiment of the invention;

FIG. 2 is a vertical sectional view, partially broken away, through the main heat exchanger;

FIG. 3 is a sectional view at 3—3 of FIG. 2;

FIG. 4 is a sectional view at 4—4 of FIG. 2;

FIG. 5 is a sectional view at 5—5 of FIG. 2; and

FIG. 6 is a sectional view at 6—6 of FIG. 2.

Referring now to the drawings in more detail, there is shown in FIG. 1 a nuclear reactor 1, which may suitably be of the inert gas heat-exchange medium type disclosed in Fermi et al. U.S. Patent No. 2,837,477, although other types might also be used (e.g., the hot water type or the liquid metal type disclosed in Dwyer U.S. Patent No. 2,865,827). Hot helium from said reactor passes through manifold 2 and ports 3 into the interior of main heat exchanger 4 in which it is confined by upstream bulkhead 5 and downstream bulkhead 6. Baffling for increased efficiency of heat transfer may be provided as desired. Helium leaves main heat exchanger 4 through pipe 7, filter 8, compressor 9 and aftercooler 10 and then flows through pipe 11 back into the reactor 1 for re-heating.

Sea water (or other water) is brought in through mechanical filter 12, through pipe 13 to ionic filter 14, aftercooler 10, line 15, manifold 16 and solenoid operated valves and spray nozzles 17 into tubes 18 extending with their axes parallel to the axis of the main heat exchanger 4 and having external fins (not shown). The valves 17 can be opened independently, one or any number at a time. Steam flows from the tubes 18 into turbine section 19 and forces the turbine 20 to rotate as it passes over turbine rotor blades 21 and turbine stators 22. Steam emerges from the said turbine section into flow chamber 23 and passes into variable area exit valve 24 which regulates pressure and flow rate. The steam exits through nozzle 25 for forward propulsion or through nozzle 26, which may be lowered and raised, for reverse propulsion. Adjustable baffles 27 control the pattern of the exit flow to gain efficiency and to reduce noise. Solenoid controlled hydraulic actuators 28 provide movement of nozzle 25 in both horizontal and vertical arcs and combinations thereof for guidance.

The curved gate 29 in variable flow valve 24 is lowered and raised in track 30 by electrically driven gear 31. Said gate has an arc removed from the central portion of the lower edge (not shown). As gate 29 is lowered, it progressively reduces the exit area for the steam flowing into nozzle 25. In this manner the flow rate of the steam and the thrust of the engine are regulated to meet the operational requirements which vary because of depth of operation and desired changes in velocity. Further lowering of gate 29 shuts off the flow of steam completely to nozzle 25 and prevents water from flowing into variable flow valve 24 from nozzle 25. In the last portion of its downward travel, gate 29 pushes aside spring loaded cover 32 and this action directs the steam through nozzle 26 for reverse propulsion.

The turbine 20 turns shaft 33 and, as shown schematically, drives reduction gears 34 and generator 35 to charge batteries 36 to provide vessel power generally and to drive propellers for auxiliary or other propulsion if desired. The turbine 20 is not required for propulsion, but it functions to provide auxiliary power. In the embodiment shown in the original application, there is no turbine section in the engine and auxiliary power is provided by a more conventional steam turbine generator system. The more conventional system can be included in the embodiment described herein if desired.

To clean salts and other deposits from the inner walls of tubes 18, scrapers 37 driven by gears 38, which are turned by shaft 33, are provided. In addition, cold water is brought through filter 12, line 39, valve 40, line 15, manifold 16 and nozzles 17 where it is sprayed into tubes 18 while they are hot but after the flow of hot helium from reactor 1 has been reduced. This causes salt deposits to separate from the walls of tubes 18, scrapers 37 and turbine section 19.

In operation, in the embodiment described, helium leaves the reactor 1 at 104 p.s.i. and 800° F. and emerges from main heat exchanger 4 at 75 p.s.i. and 450° F. It re-enters reactor 1, after passing through the equipment specified, including aftercooler 10, at 180° F. and 115 p.s.i. Sea water is heated in the aftercooler 10 to 180° F. and is pumped through manifold 16 at 1200 p.s.i. into heat exchanger 4 in which the water is vaporized and superheated to 500° F. at 500 p.s.i. The above temperatures and pressures are approximate and may be varied.

Other embodiments within the spirit of the invention and scope of the following claims will, of course, occur to those skilled in the art.

I claim:

1. A marine engine comprising a nuclear reactor for heating a heat-exchange medium; heat-exchange means for transferring heat from said medium to generate steam at high temperature and pressure, said heat-exchange means including a cylindrical shell, a torus-shaped manifold extending at least partially therearound for introduction thereinto of said heat-exchange medium while hot through ports, a multiplicity of steam chambers positioned in said shell with their axes parallel to the axis of said shell, a multiplicity of independently operable vaporization nozzles for introduction of water into said steam chambers and separation means within said cylindrical shell confining said heat-exchange medium upstream thereof and collecting steam from said steam chambers downstream thereof for use in propulsion; a main nozzle for discharge of said steam therethrough for jet propulsion of a vessel; a turbine that is driven by steam emerging from said steam chambers; and a generator which is driven by power derived from said turbine through a drive shaft and reduction gears.

2. The engine of claim 1 which includes scrapers mounted to move over the inner surfaces of said steam chambers to remove salts deposited thereon and a means for directing the flow of cold water into said steam chambers and on said scrapers and said turbine to also remove salts deposited thereon.

(References on following page)

References Cited in the file of this patent

UNITED STATES PATENTS

| | | |
|---|---|---|
| 85,027 | Richards | Dec. 15, 1868 |
| 1,229,729 | Edinger | June 12, 1917 |
| 1,259,753 | Lassell | Mar. 19, 1918 |
| 2,024,274 | Campini | Dec. 17, 1935 |

OTHER REFERENCES

Proceedings of the Second United Nations International Conference on the Peaceful Uses of Atomic Energy, vol. 8, United Nations, Geneva 1958, pp. 358–364, 159–163.